United States Patent [19]

Hirsch

[11] 4,087,652

[45] May 2, 1978

[54] MICROPHONE SWITCH KEY

[76] Inventor: Don J. Hirsch, 670 N. Cambridge, Orange, Calif. 92667

[21] Appl. No.: 795,285

[22] Filed: May 9, 1977

[51] Int. Cl.[2] ........................ H04M 1/04; H01H 21/10

[52] U.S. Cl. .................................... 179/147; 179/167; 200/157; 200/332

[58] Field of Search ................ 179/147, 167; 200/332, 200/157

[56] References Cited

U.S. PATENT DOCUMENTS

| | | | |
|---|---|---|---|
| 1,431,925 | 10/1922 | Bohlman | 179/147 |
| 2,611,037 | 9/1952 | De Napoli | 179/167 |
| 3,488,456 | 1/1970 | Naki | 179/167 |
| 3,935,410 | 1/1976 | Howard | 200/332 |
| 4,037,063 | 7/1977 | McDonald | 179/147 |

*Primary Examiner*—Steven L. Stephan

[57] ABSTRACT

A microphone and stand assembly for either hand held use or use with the base resting on a flat surface. An arm parallel to the microphone supporting structure which activates a switch when depressed to turn the microphone on, a spring mechanism to bias the arm in a normally off position. A key mechanism which can be engaged by the fingers or thumb and when minimum pressure is exerted will co-act with the switch arm to turn the microphone on. When the fingers or thumb pressure is released the microphone switch will return to the normally off position.

1 Claim, 4 Drawing Figures

MICROPHONE SWITCH KEY

BACKGROUND OF THE INVENTION

1. Field of the Invention

The present invention relates to microphones with stands generally and specifically to Astatic Microphones with stands and devices to make actuation of the on-off mode attainable by slight pressure with the fingers or thumb.

2. Description of the Prior Art

Prior to the present invention Astatic Microphones have been manufactured with the microphone mounted on a support which is attached to a base.

Protruding from the support is a switch button which is biased by a spring to the normally off position. A hinged arm is attached to the microphone support so as to engage the switch. When the microphone is grasped by either hand and pressure exerted the hinged arm depresses the switch button to turn the microphone on.

The microphone cannot be turned off and on with the fingers or thumb of the hand alone but must be grasped by the entire hand and hand pressure exerted to activate the switch.

OBJECTS AND ADVANTAGES OF THE INVENTION

It is an object of this invention to provide a novel key which will enable an Astatic microphone to be activated by slight pressure of a finger or thumb.

It is a further object of this invention to allow an Astatic microphone to rest on its base and be activated without grasping the microphone support structure with the entire hand.

Further objects and advantages of the present invention will be readily apparent from a further consideration of the specifications and the drawings which follow.

DESCRIPTION OF THE PREFERRED EMBODIMENT

Figure 1:
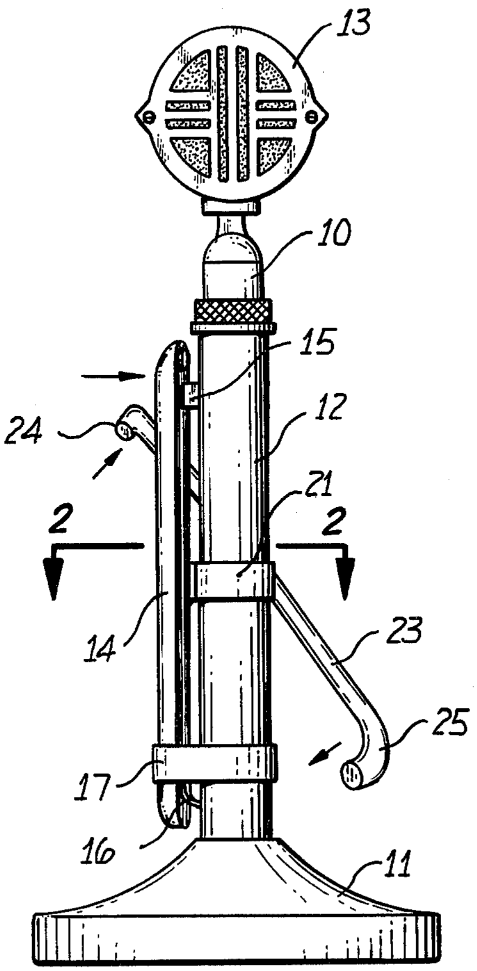
FIG. 1 is a plan view of an Astatic microphone with the key of this invention attached thereto.
Figure 2:
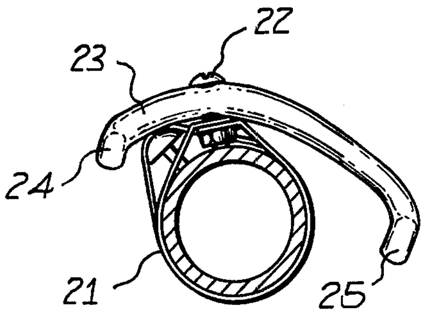
FIG. 2 is a sectional view through line 2—2.
Figure 3:
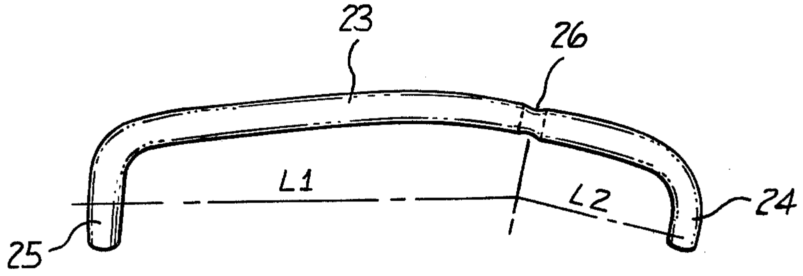
FIG. 3 is a plan side view of the key without the attachment means.
Figure 4:
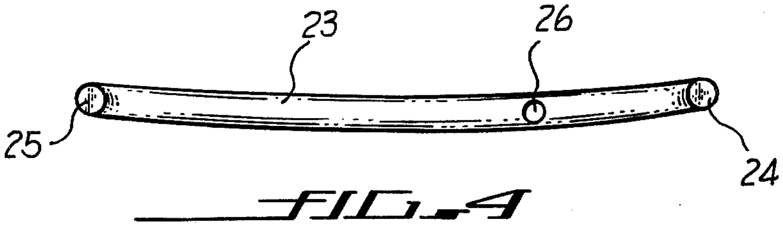
FIG. 4 is a face on view of the key without the attachment means.

As illustrated in FIG. 1, the Astatic microphone 10 is normally constructed with a stand 11, a cylindrical supporting structure 12 on which a microphone 13 is mounted, a switch arm 14 is maintained in contact with on-off switch 15 by biasing spring 16 and circular collar 17. As illustrated in FIG. 1 this microphone can only be turned on by grasping the support member 12 and switch arm 14 and exerting pressure thereon overcoming the biasing force of spring 16 and depressing switch 15.

FIGS. 1 through 4 illustrate various views of the present invention. The invention herein described is mounted on said cylindrical supporting member 12 and consists of a circular collar 21, fastener means 22 and a wide U-shaped key 23. The U-shaped key has a unique shape so as to engage the top of switch arm 14 with one leg 24 while the other leg 25 is positioned just above the base 11 so as to be easily depressed with the fingers or thumb of one hand.

An opening 26 passing through the key and through which fastener 22 is passed is located so that the distance between the mid-point of 26 to the farthest end of leg 25, designated L1, is at least two times the distance from the mid-point of opening 26 to the farthest end of leg 24, designated L2.

This results in the well known lever effect by which a small force exerted on one end may exert a larger force at the opposite end.

In operation the Astatic microphone 10 may be located on a flat surface resting upon stand 11. An operator may activate it by engaging key leg 25 with his fingers or thumb.

With slight pressure moving key leg 25 downward and toward support member 12. The key will pivot on fastener 22 and key leg 24 will engage switch arm 14 near its upper end. The force exerted by key leg 24 will be proportionately greater then the force applied to key leg 25 as the ratio of L1 is to L2 when this force is greater than the force of spring 16 which is biasing arm 14 in disengagement with switch 15 arm 14 will move to engage switch 15 and turn the microphone on. Release of the pressure on key leg 25 will reverse the process and the microphone will resume the normal off mode.

These and other modifications of the invention may be devised by those skilled in the art upon study of the preceeding drawings and specifications.

I claim:

1. An microphone key switch assembly comprising in combination:

a microphone stand, said stand having a cylindrical support structure mounted at a 90° angle thereon;

a microphone mounted at the top of such cylindrical support structure;

an on-off button pressure switch biased permanently off mounted within such cylindrical support structure with the button protruding above the surface of the cylindrical structure;

a switch arm having top and bottom ends;

a spring member;

a first circular support collar fastened to said switch arm and encircling said cylindrical support structure and said switch arm trapping the spring member between the cylindrical support structure and the bottom end of the switch arm so that the top end of the arm is just in engagement with the switch button;

a U-shaped key with an opening passing through it parallel to the legs of the U and located so that the distance from the center of the opening to the farthest end of one leg is at least two times the distance from the center of the opening to the farthest end of the shorter leg;

fastener means one end of which engages the U-shaped key the other end passes through said opening in said U-shaped key and protrudes above said opening;

a second circular support collar attached to the protruding end of said fastener and encircling the cylindrical support member and located above the first circular support bracket so that the shorter leg of the U is in engagement with the top of the switch arm and the longer leg is above the microphone stand and extended away from the cylindrical support structure;

slight pressure by the finger or thumb against said longer leg forcing the shorter leg to co-act with the switch arm to turn the microphone on and by the release of such pressure the parts return to their original off mode.

* * * * *